July 19, 1949.  W. M. TOWLE  2,476,930
VARIABLE CONDENSER
Filed Aug. 19, 1946  2 Sheets-Sheet 1
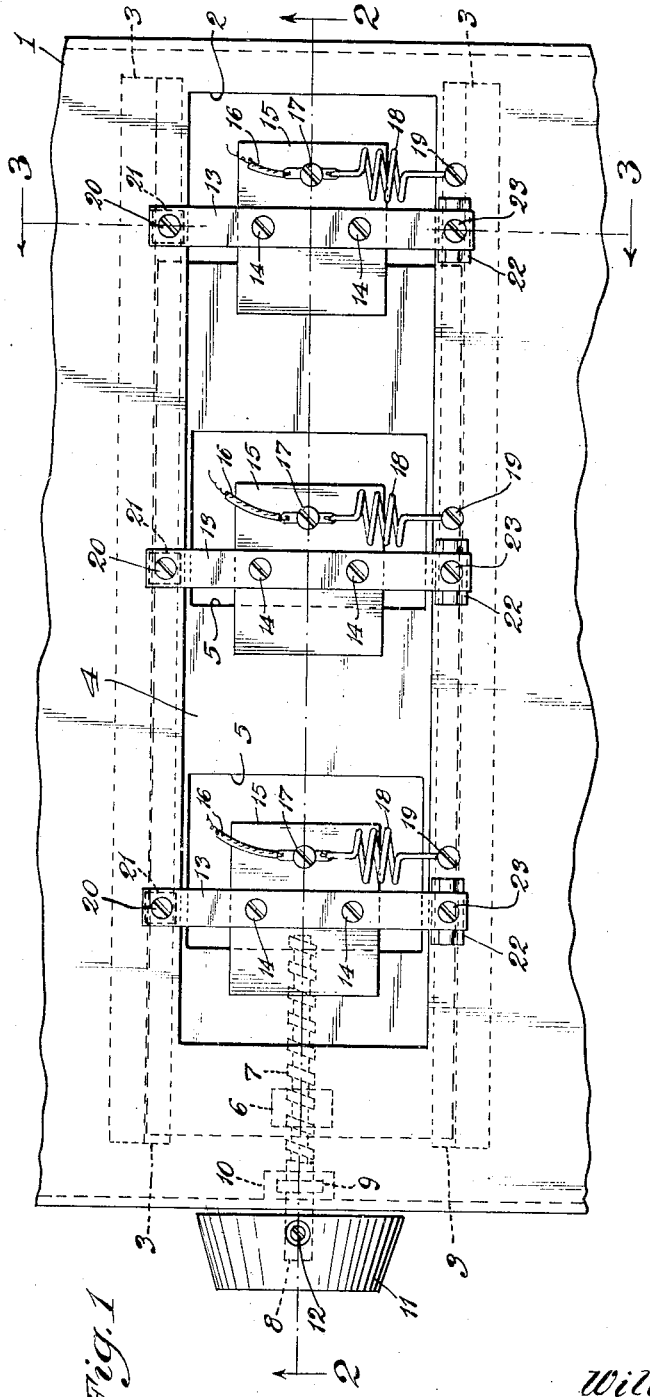
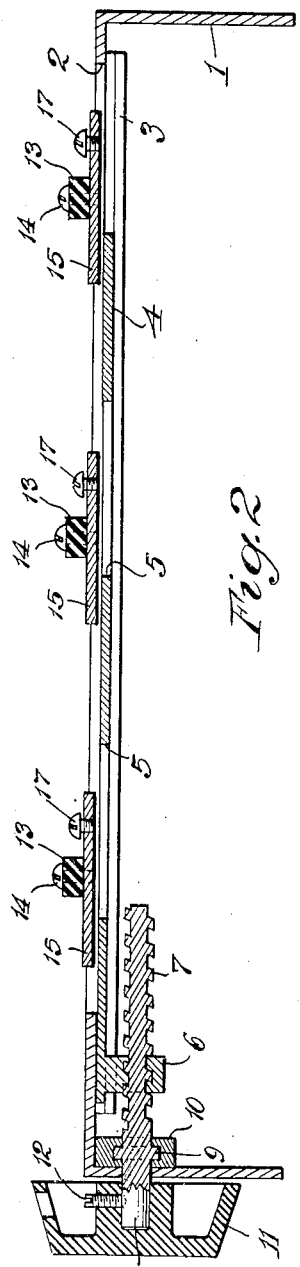
Inventor
Willard M. Towle
by Parker & Carter
Attorneys July 19, 1949. W. M. TOWLE 2,476,930
VARIABLE CONDENSER
Filed Aug. 19, 1946 2 Sheets-Sheet 2
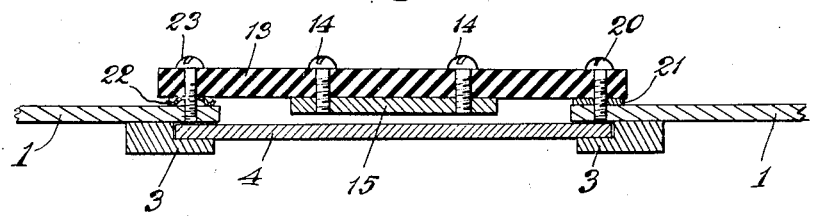
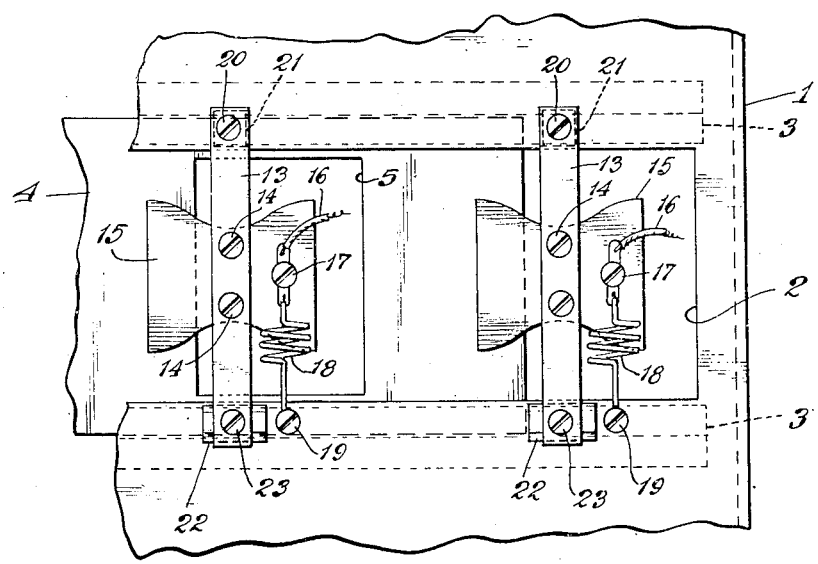
Inventor
Willard M. Towle
by Parker & Carter
Attorneys.

Patented July 19, 1949

2,476,930

UNITED STATES PATENT OFFICE 2,476,930

VARIABLE CONDENSER

Willard M. Towle, Chicago, Ill., assignor to Midwest Laboratories, Inc., Chicago, Ill., a corporation of Illinois Application August 19, 1946, Serial No. 691,633

3 Claims. (Cl. 175—41.5)

My invention relates to improvements in variable condensers.

It has for one object to provide a new type of variable condenser which may be used in connection with all kinds of RF instruments, will be cheap, easy to manufacture, compact, take up little room in the chassis while giving more room to work where room is needed, subject to exceptional accuracy of adjustment, made almost entirely of stamped out parts and wherein the condenser plates may be easily and conveniently shaped to give any desired tuning. The condenser I propose is rigid, remains in adjustment, gives accurate tuning, may be used in connection with a multiplicity of arrangements of electronic apparatus and will give a wide range of capacity and tracking.

Other objects will appear from time to time in the course of the specification and claims.

The invention is illustrated more or less diagrammatically in the accompanying drawings wherein:

Figure 1 is a plan view;

Figure 2 is a section along the line 2—2 of Figure 1;

Figure 3 is a section along the line 3—3 of Figure 1; and

Figure 4 is a part plan view of a modification of the condenser plates shown in Figure 1.

Like parts are indicated by like characters throughout the specification and drawings.

1 is a chassis base for a radio set. Punched out of a plane portion of this chassis is a relatively long rectangular aperture 2, bounded on both sides by track members 3, which form guide slots to receive a movable condenser plate 4. There is electric contact between condenser plate 4, track members 3 and chassis 1. The movable condenser plate has disposed therein two rectangular apertures 5. Downwardly extending from one end of the movable condenser plate is a nut 6, adapted to travel along screw 7. The screw 7 is on a shaft 8 having a collar 9 enclosed in the socket 10, fixed in position in the chassis. 11 is a tuning knob of the usual type fixed on the shaft 8 by the set screw 12. Rotation of the tuning knob 11 longitudinally displaces the movable condenser plate 4.

Extending across the aperture 2 are bridge bars 13. Each bridge supports by suitable means, such as screws 14, a fixed condenser plate 15, which is electrically insulated from the remainder of the apparatus. In a typical construction the condenser plate 15 is electrically connected, by conductor 16 from the lug 17, with the grid of a tube preferably located immediately above the condenser. The lug 17 on the condenser plate 15 is also connected by coil 18 to ground lug 19 on the chassis. Each bridge insulates the condenser it supports and is mounted on chassis 1 by screw 20, one end of which holds the bar against a spacer 21. The other end of the bar rests on a leaf spring 22, or other suitable flexible compressible support member, being held thereagainst by a trimmer screw 23. Adjustment of the condenser is made by the spacer 21 and the trimmer screw 23 and spring 22. Interchangeable spacers may provide coarse adjustment, spacers of different thickness being selected to give an appropriate air gap to provide the capacity desired, which will depend on the usage, then the fine adjustment is made by turning the trimmer screw with a screw driver in the usual manner. The adjustments are in the order of thousandths of an inch and the flexibility of the bridge bar permits adjustment, as the fixed and movable conductor plates are moved toward or from one another. The very slight angularity introduced by adjustment of the trimmer screw is so slight as to be negligible.

As the tuning knob is rotated the movable condenser plates move back and forth increasing or decreasing the opposed area between fixed and movable plates, thereby changing the capacity of the condenser in the well known manner.

Because the movable condenser plate is a flat, rigid structure moving back and forth between guides, which adequately support both edges, and because it is displaced by the screw and nut drive mechanism, maximum accuracy results. No distortion, no twisting, no bending of the parts as is characteristic of a rotary variable condenser is possible. Change in the air gap is easily made so one condenser may be employed for a multiplicity of uses, a large number of condenser plates may be stamped out in advance and assembled and adjusted easily. If desired, a series of movable plates, or a series of fixed plates, may be used in the same chassis for testing and the like to meet different circumstances.

While in Figure 1, I have shown the opening in the movable condenser plate and the fixed condenser plate rectangular, I have illustrated in Figure 4 a situation where the plates are irregular because my invention makes it possible to design a structure wherein the parts of the condenser may be shaped to give any desired tuning or any sort of tracking desired. Aside from this change in the shape of the two condenser plates, the device of Figure 4 is the same as the device of Figure 1.

The type of condenser which I illustrate provides straight line capacity tuning. The plates may be shaped to give straight line frequency or other desired characteristics. The trimmer arrangement allows slight adjustment in spacing between condenser plates with micrometric precision so capacity may be changed to facilitate tracking and accurate tuning throughout the frequency band. The pitch of the screw and thread may be selected to give any desired displacement depending on the use, the type of mechanism, etc. For FM 88–108 mc., four turns for tuning the entire band has been found suitable.

An important advantage of my condenser is that by the use of the trimmer screw or other suitable trimmer mechanism, whereby the gap between the fixed and movable plate is micrometrically adjusted, I obtain accurate tuning through the entire frequency band for which the apparatus is designed since the change in capacity is symmetrical.

I have illustrated three condensers. However, the same principle may be used for one, two or many more than three condensers as the case may be. I have illustrated an irregularly shaped fixed plate. The irregular shaping might be applied to the movable plate or to both. I have shown air as the dielectric. If greater capacity is desired, other dielectrics might be used.

I claim:

1. A condenser including an apertured flat condenser plate, guide means therefor adapted to constrain it to movement in a plane parallel with the plate and means for moving it longitudinally in such plane along a line intersecting on the apertures therein, a plurality of separate condenser plates insulated from the apertured plate, means for supporting them in general parallelism with and adjacent but out of contact with the apertured plate, said separate plates being spaced apart substantially equal to the spaces between the apertures whereby each condenser plate overlies one of the apertures and whereby longitudinal movement of the plate varies the areas wherein the separate plates overlie the body of the apertured plate.

2. A condenser including an apertured flat condenser plate, guide means therefor adapted to constrain it to movement in a plane parallel with the plate and means for moving it longitudinally in such plane along a line intersecting on the apertures therein, a plurality of separate condenser plates insulated from the apertured plate, means for supporting them in general parallelism with and adjacent but out of contact with the apertured plate, said separate plates being spaced apart substantially equal to the spaces between the apertures whereby each condenser plate overlies one of the apertures and whereby longitudinal movement of the plate varies the areas wherein the separate plates overlie the body of the apertured plate, means for supporting the separate plates comprising bridges extending across the apertured plate.

3. A condenser including an apertured flat condenser plate, guide means therefor adapted to constrain it to movement in a plane parallel with the plate and means for moving it longitudinally in such plane along a line intersecting on the apertures therein, a plurality of separate condenser plates insulated from the apertured plate, means for supporting them in general parallelism with and adjacent but out of contact with the apertured plate, said separate plates being spaced apart substantially equal to the spaces between the apertures whereby each condenser plate overlies one of the apertures and whereby longitudinal movement of the plate varies the areas wherein the separate plates overlie the body of the apertured plate, means for supporting the separate plates comprising bridges extending across the apertured plate, means for moving at least one end of each bridge to adjust the space between the opposed apertured and separate condenser plates.

WILLARD M. TOWLE.

REFERENCES CITED

The following references are of record in the file of this patent:

UNITED STATES PATENTS

| Number | Name | Date |
| --- | --- | --- |
| 1,580,621 | Mahieu | Apr. 13, 1926 |
| 1,623,360 | Rodgers | Apr. 5, 1927 |

FOREIGN PATENTS

| Number | Country | Date |
| --- | --- | --- |
| 454,845 | Great Britain | Oct. 5, 1936 |
| 591,082 | France | June 27, 1925 |